Feb. 17, 1953  H. A. SMITH  2,629,040
HOG WATERING TANK
Filed May 6, 1952
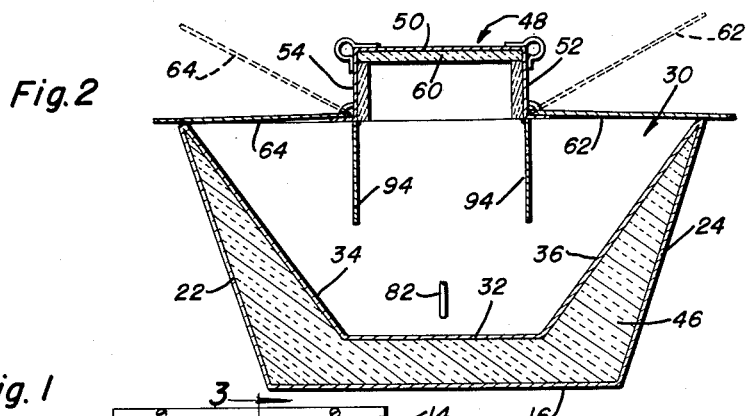
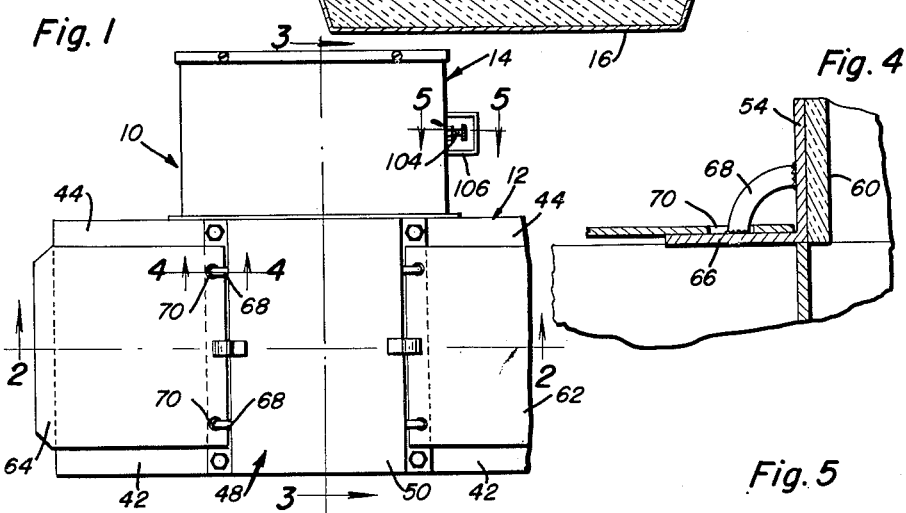
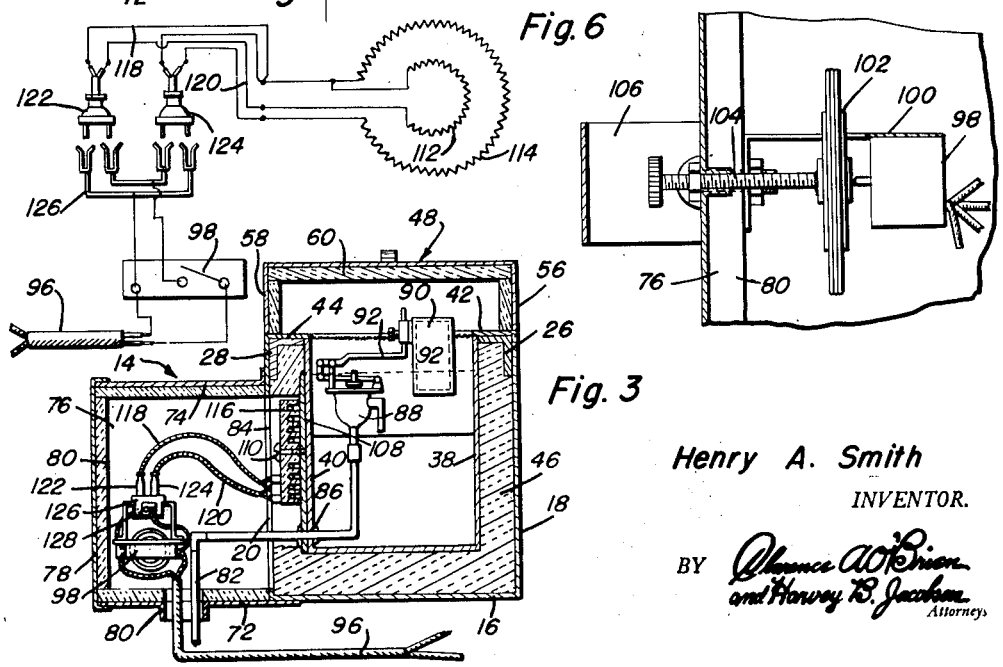
Henry A. Smith
INVENTOR.

Patented Feb. 17, 1953

2,629,040

UNITED STATES PATENT OFFICE 2,629,040

HOG WATERING TANK

Henry A. Smith, Mechanicsburg, Ohio

Application May 6, 1952, Serial No. 286,337

3 Claims. (Cl. 219—38)

This invention relates in general to farm equipment, and more specifically to a hog watering tank.

The primary object of this invention is to provide an improved hog watering tank which is provided with control means for automatically controlling the flow of water thereto and the temperature of said water whereby said hog watering tank is completely automatic.

Another object of this invention is to provide an improved hog watering tank especially designed for cold weather installation, said hog watering tank including a housing in which is disposed a tank, the walls of said tank being spaced from said housing and said space being filled with insulation.

Another object of this invention is to provide an improved hog watering tank which is of rigid construction so as to provide a practical and substantially indestructible tank for the watering of hogs.

A further object of this invention is to provide a hog watering tank equipped with heater means for maintaining water disposed in said tank above freezing temperature, said heating means including a pair of electric heating coils controlled by thermostatic means, said heating coils being selectively energized.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a fragmentary top plan view of the improved hog watering tank, which is the subject of this invention, and shows the general outline thereof, a portion of the upper part of the tank portion being omitted;

Figure 2 is a transverse vertical sectional view taken substantially on the plane indicated by the section line 2—2 of Figure 1 and showing the general construction of the interior of the tank portion, valve means for controlling the flow of water into said tank being omitted;

Figure 3 is a transverse vertical sectional view taken substantially upon the plane indicated by the section line 3—3 of Figure 1 and showing the general arrangement of the various control means of the water tank;

Figure 4 is a fragmentary enlarged transverse vertical sectional view taken substantially on the plane indicated by the section line 4—4 of Figure 1 and showing the construction of the hinge for cover plates of the tank;

Figure 5 is an enlarged fragmentary transverse vertical sectional view taken substantially upon the plane indicated by the section line 5—5 of Figure 1 and showing the general arrangement of thermostatic control means for the heater means of the hog watering tank; and, Figure 6 is a schematic wiring diagram showing the manner in which a pair of heating coils are selectively connected to a power source.

Similar characters of reference designate similar or identical elements and portions throughout the specifications and throughout the several views of the drawings.

Referring now to the accompanying drawings in detail, it will be seen that the hog watering tank, which is the subject of this invention, includes a generally T-shaped in plan view housing which is referred to in general by the reference 10. The T-shaped housing 10 includes a cross arm portion 12 and a stem portion 14, said cross arm portion 12 being of a greater height than the stem portion 14.

Referring now to Figures 2 and 3 in particular, it will be seen than the cross arm portion 12 includes a base 16 provided with upstanding trapezoidal end walls 18 and 20 at the side edges thereof, the end walls being of a maximum width at the upper ends thereof. Extended between the side walls 18 and 20 and secured to the ends thereof are upwardly and outwardly sloping ends 22 and 24. Extending parallel to the upper edges of the side walls 18 and 20 and connected to the inner sides thereof are longitudinally extending angle members 26 and 28, respectively, the angle members having vertical flanges secured to the bases of their respective side walls and horizontal flanges extending inwardly therefrom.

Disposed within the cross arm portion 12 of the housing 10 is a water tank, which is referred to in general by the reference numeral 30, the water tank including a flat base 32 disposed vertically above the base 16 and being of less length and width than the base 16. Integral with the ends of the base 32 are upwardly and outwardly sloping end walls 34 and 36 which are connected at the upper ends to the upper ends of the end walls 22 and 24, respectively. Extending between the edges of the end walls 34 and 36 and secured thereto and to the side edges of the base 32 are trapezoidal side walls 38 and 40. It will be noted that the side walls 38 and 40 are spaced from the side walls 18 and 20 and are connected at their upper edges to the ends of the horizontally extending flanges of the angle members 26 and 28, respectively. The upper portion of the space between the side walls of the housing 10 and the side walls of the tank 30 are closed by inwardly directed horizontally extending plate portions 42 and 44 which overlie the angle members 26 and 28, respectively, and are secured to the upper edges of the side walls 38 and 40 as well as the side walls 18 and 20, respectively. In order that the tank 30 may be insulated from the elements, insulation 46 is disposed between the housing 10 and the tank 30.

Referring now to Figure 2 in particular, it will be seen that extending transversely of the cross arm portion 12 of the housing 10 is an upwardly projecting central portion, which is referred to in general by the reference numeral 48, the central portion including a horizontal top wall 50 in spaced parallel relation to the plates 42 and 44. Integral with the top 50 and extending downwardly therefrom are side walls 52 and 54 which extend between the walls 18 and 20. It will be noted that the side walls 18 and 20 are provided with upwardly projecting central portions 56 and 58 which form the ends of the central portion 48. The central portion 48 is also insulated, the walls thereof being provided with sheet insulation 60.

In order that access to the interior of the tank 30 may be readily attained, the open upper ends of the tank 30 between the plates 42 and 44 are closed by cover plates 62 and 64 hingedly secured to the side walls 52 and 54, respectively, of the central portion 48. It will be noted that the cover plates 62 and 64 have end portions which extend beyond the upper ends of the housing 10 so as to permit the same to be easily raised.

As is best illustrated in Figure 4, the lower edge of the side wall 54 has integral therewith a horizontally extending flange 66. Extending between the flange 66 and the lower portion of the side wall 54 is a curved sectional rod 68 which is disposed within an opening 70 in the inner end of the cover plate 64. It will be understood that two such curved rods 68 are provided for properly mounting the cover plate 64. Also, it will be understood that the side wall 52 is also provided with a horizontal flange similar to the flange 66 and that the cover plate 62 is hingedly connected thereto by a pair of curved rods such as the rods 68.

Referring now to Figure 3 in particular, it will be seen that the stem portion 14 of the housing 10 includes a bottom 72 having a portion thereof underlying the base 16 and rigidly secured thereto. The stem portion 14 also includes a top wall 74 which is in spaced parallel relation to the bottom 72 and connected thereto by a pair of vertically extending side walls 76. It will be understood that the top 74 and the side walls 76 are provided with flanges along the edges which are secured to the outer surface of the side wall 20. The other end of the stem portion 14 is closed by an end wall 78 which is provided with inwardly turned flanges along its peripheral edges, said flanges overlying the bottom 72, the top 74 and the side walls 76. The stem portion 14 is also insulated by sheet insulation 80.

The bottom 72 of the stem portion 14 is provided with a centrally located opening 80 through which projects outwardly a water supply line 82. The water supply line 82 extends into the cross arm portion 12 of the housing 10 through an enlarged rectangular opening 84 in the side wall 20, said opening 84 being substantially the same dimensions as the stem portion 14. The water supply line 82 then extends through a fitting 86 in the side wall 40 of the tank 30 and upwardly therefrom. Connected to the upper end of the water supply line 82 is a conventional valve mechanism 88 which is operated by a float 90 connected thereto by a float control arm 92 to regulate the flow of water into the tank 30 and control the height thereof. The valve 88 and the float 90 are disposed in vertical alignment with the central portion 48 and protected from damage by hogs drinking out of the tank, by vertically extending guards 94 in the form of sheets of metal extending downwardly from the side walls 52 and 54 and extending transversely between the side walls 38 and 40 of the tank 30.

Also extending upwardly through the opening 80 in the bottom 72 is an electric cord 96 which is connected to a switch mechanism 98 disposed within the stem portion 14.

Referring now to Figure 5 in particular, it will be seen that the switch 98 is carried from one of the side walls 76 by a mounting bracket 100 and operated by a thermostatic element 102. The thermostatic element 102 is set by an adjusting screw 104 which extends outwardly through the side walls 76 and is protected from damage by a channel-shaped guard 106 secured to the outer surface of the side wall 76. It will be understood by turning the adjusting screw 104 the temperature at which the switch 98 is operated may be controlled.

In order that the water in the tank 30 may be properly heated, the side wall 40 has secured thereto a vertically extending plate 108 to which is fastened by a fastener 110 a pair of heating coils 112 and 114 which are mounted upon an insulating plate 116. Extending from the heating coils 112 and 114 are electric cords 118 and 120, respectively, which are provided at their free ends with plugs 122 and 124, respectively. The plugs 122 and 124 are plugged in a receptacle 126 which is connected to the switch 98 and mounted on suitable mounting brackets 128.

Referring now to Figure 6 in particular, it will be seen that there is illustrated a wiring diagram for the heating coils 112 and 114 and shows the manner in which the supply of electricity thereto is controlled by the thermostatic operated switch 98. Inasmuch as the heating coils 112 and 114 may be connected to the power source as desired by plugging in the plugs 122 and 124, respectively, in the receptacle 126, it will be seen that the heating coils may be connected and disconnected at will. In practice, the heating coil 112 is intended to produce much less heat than the heating coil 114 and it is intended to be used in mild weather. Therefore, when there is mild weather the heating coil 114 is disconnected by pulling the plug 124 out of the receptacle 126. When the temperature begins to drop and more heat is necessary to keep the water in the tank 30 above a freezing temperature, a temperature of 50 degrees is desirable, the plug 124 is once again plugged into the receptacle 126 and both the heating coil 112 and the heating coil 114 are connected to a power source. Due to the novel feature of the heating means, not only is water automatically supplied to the tank 30, but the temperature thereof is also automatically controlled whereby no ice is formed therein. It will be noted that the positions of the heating coils 112 and 114 are such that the water supply line 82 is heated and water therein is prevented from freezing.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A hog watering tank comprising a housing, a water tank disposed within said housing and insulated therefrom, heater means for said tank, a thermostat for controlling said heater means, said housing having a top including a central portion extending upwardly above side portions thereof, said side portions being in the form of plate hingedly connected to said central portion for providing access to said tank.

2. A hog watering tank comprising a housing, a water tank disposed within said housing and insulated therefrom, heater means for said tank, a thermostat for controlling said heater means, said housing having a top including a central portion extending upwardly above side portions thereof, said side portions being in the form of plate hingedly connected to said central portion for providing access to said tank, valve means for controlling the flow of water into said tank, said valve means being disposed in the upper part of said tank and beneath said central portion.

3. A hog watering tank comprising a housing, a water tank disposed within said housing and insulated therefrom, heater means for said tank, a thermostat for controlling said heater means, said housing having a top including a central portion extending upwardly above side portions thereof, said side portions being in the form of a plate hingedly connected to said central portion for providing access to said tank, a valve means for controlling the flow of water into said tank, said valve means being disposed in the upper part of said tank and beneath said central portion, transversely extending guards mounted with said tank in vertical alignment with the sides of said central portion.

HENRY A. SMITH.

REFERENCES CITED

The following references are of record in the file of this patent:

UNITED STATES PATENTS

| Number | Name | Date |
|---|---|---|
| 1,475,630 | Herz | Nov. 27, 1923 |
| 2,133,388 | Henderson | Oct. 18, 1938 |
| 2,511,721 | Langenbahn | June 13, 1950 |
| 2,545,967 | Mickalek | Mar. 20, 1951 |